(12) United States Patent
De Schutter et al.

(10) Patent No.: US 12,499,526 B2
(45) Date of Patent: Dec. 16, 2025

(54) IMAGE VISUAL QUALITY ASSESSMENT SYSTEMS AND METHODS

(71) Applicant: Snap Inc., Santa Monica, CA (US)

(72) Inventors: Meena De Schutter, Santa Monica, CA (US); Bo Feng, Los Angeles, CA (US); Ruogu Zeng, Los Angeles, CA (US); Anbang Zhao, Seattle, WA (US)

(73) Assignee: Snap Inc., Santa Monica, CA (US)

( * ) Notice: Subject to any disclaimer, the term of this patent is extended or adjusted under 35 U.S.C. 154(b) by 724 days.

(21) Appl. No.: 17/726,360

(22) Filed: Apr. 21, 2022

(65) Prior Publication Data

US 2023/0342898 A1 Oct. 26, 2023

(51) Int. Cl.
*G06T 7/00* (2017.01)
*G06V 40/16* (2022.01)

(52) U.S. Cl.
CPC .......... *G06T 7/0002* (2013.01); *G06V 40/161* (2022.01); *G06T 2207/20084* (2013.01)

(58) Field of Classification Search
None
See application file for complete search history.

(56) References Cited

U.S. PATENT DOCUMENTS 11,341,429 B1 * 5/2022 Pihur ........................ G06N 5/04
11,809,972 B2 * 11/2023 Pihur ...................... G06N 20/00
2017/0013191 A1 * 1/2017 Saad ........................ G06V 20/35
2019/0050749 A1 * 2/2019 Sanketi ................... G06N 20/00
2019/0332897 A1 * 10/2019 Chen ........................ G06T 7/215
2022/0245524 A1 * 8/2022 Pihur ....................... G06N 5/04
2023/0342898 A1 * 10/2023 De Schutter .......... G06T 7/0002

OTHER PUBLICATIONS

"International Application Serial No. PCT/US2023/017680, International Search Report mailed Jul. 24, 2023", 4 pgs.
"International Application Serial No. PCT/US2023/017680, Written Opinion mailed Jul. 24, 2023", 6 pgs.
"Methodology for the subjective assessment of the quality of television pictures", Recommendation ITU-R BT.500-11, [Online] Retrieved from the Internet: <URL: https://www.itu.int/dms_pubrec/itu-r/rec/bt/R-REC-BT.500-11-200206-SIIPDF-E.pdf>, (2002), 48 pgs.
Bianco, Simone, "On the Use of Deep Learning for Blind Image Quality Assessment", arXiv:1602.05531v5 [cs.CV], (2017), 8 pgs.

(Continued)

*Primary Examiner* — Tahmina N Ansari
(74) *Attorney, Agent, or Firm* — Schwegman Lundberg & Woessner, P.A.

(57) ABSTRACT

A method of image quality assessment, performed by one or more processors in an image capture device, is disclosed. The method comprising receiving notification of capture of an image and in response, initiating an image assessment task to assess the quality of the image. The assessment task comprises determining suitability of the image for image quality assessment, running an image quality assessment model on the image to generate image quality assessment results, collecting data related to the capture of the image, and transmitting the results to an image quality assessment repository. The image assessment task may be a lower priority asynchronous task.

18 Claims, 7 Drawing Sheets

(56) References Cited

OTHER PUBLICATIONS

Bovik, Alan Conrad, "Automatic Prediction of Perceptual Image and Video Quality", Proc. of the IEEE, 101(9), (2013). 2008-2024.
Datta, Ritendra, "Studying Aesthetics in Photographic Images Using a Computational Approach", Computer Vision—ECCV 2006: 9th European Conference on Computer Vision, Graz, Austria, May 7-13, 2006, Proceedings, Part III 9, pp. 288-301, Springer Berlin Heidelberg, (2006), 14 pgs.
Kim, Jongyoo, "Deep Convolutional Neural Models for Picture-Quality Prediction: Challenges and Solutions to Data-Driven Image Quality Assessment", IEEE Signal Processing Magazine, 34(6), (2017), 130-141.
Lin, Weisi, "Perceptual visual quality metrics: A survey", Journal of Visual Communication and Image Representation, 22(4), (2011), 297-312.
Moorthy, Anush Krishna, "Blind Image Quality Assessment: From Natural Scene Statistics to Perceptual Quality", IEEE Transactions on Image Processing, 20(12), (2011), 3350-3364.
Wang, Zhou, "Mean squared error: Love it or leave it? A new look at Signal Fidelity Measures", IEEE Signal Processing Magazine, 26(1), (2009), 98-117.
Zhu, Wenhan, "A Multiple Attributes Image Quality Database for Smartphone Camera Photo Quality Assessment", arXiv:2003.01299v1 [eess.IV], (Mar. 3, 2020), 6 pgs.
Talebi, Hossein, et al., "NIMA: Neural Image Assessment", arXiv:1709.05424v2 [cs.CV]; IEEE Transactions on Image Processing 2018, (Apr. 26, 2018), 15 pgs.

\* cited by examiner

IMAGE VISUAL QUALITY ASSESSMENT SYSTEMS AND METHODS

TECHNICAL FIELD

The present disclosure relates generally to the assessment of the quality of images captured by user image capture devices such as smartphones or tablets.

BACKGROUND

Current widespread use of image-sharing platforms such as messaging applications, including social media applications and media-sharing or posting applications, and the associated indicators of approval such as a thumbs up or a "like" by viewers of the image, has made the quality of images that are captured by user devices of particular importance. Good quality images promote enjoyment of and engagement with such platforms by people who have captured such images, as well as with recipients or other viewers of the images on the platform.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
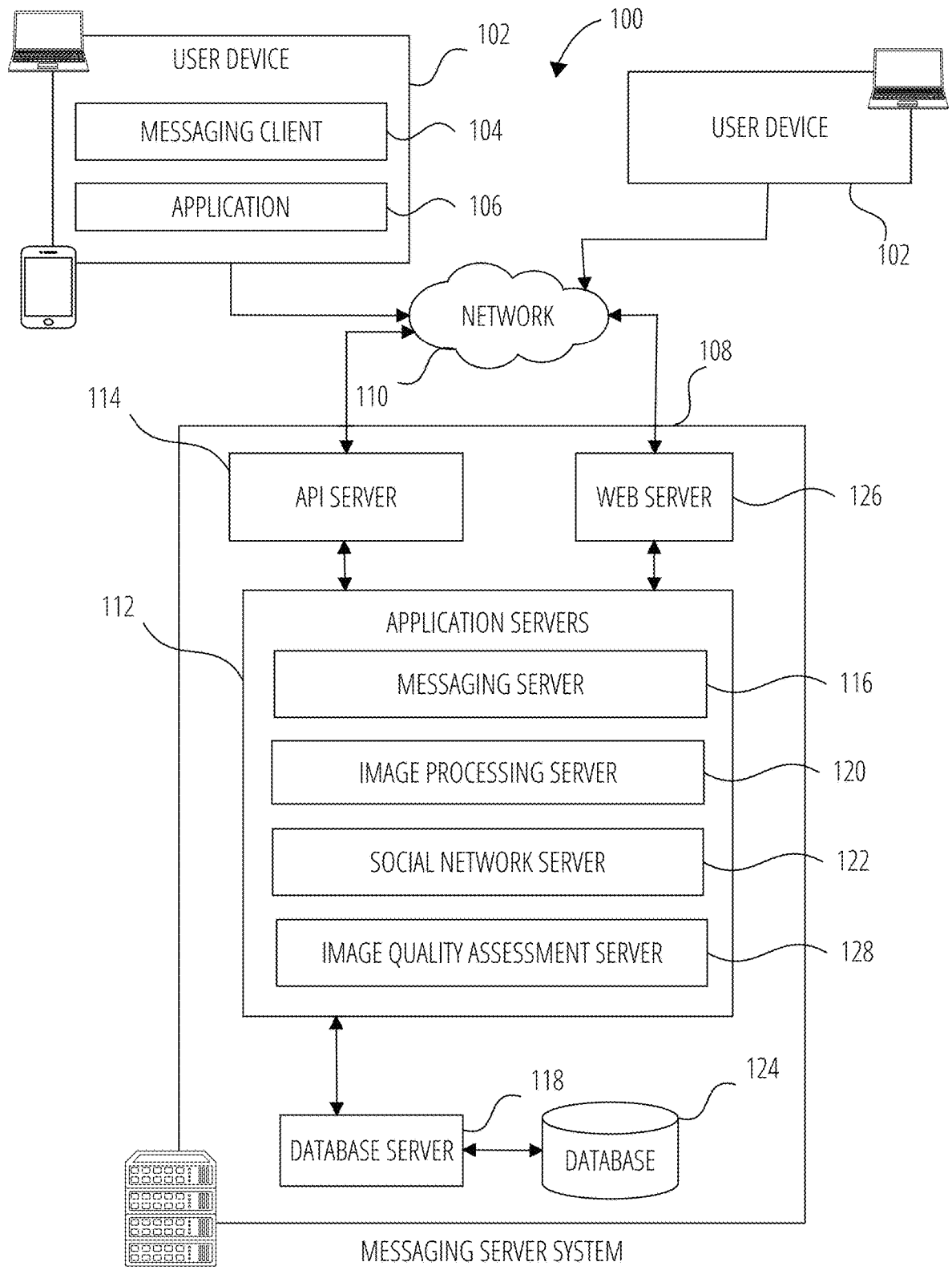
FIG. 1 is a diagrammatic representation of a networked environment in which the present disclosure may be deployed, in accordance with some examples.

Automatic quality assessment for images is important to a wide variety of applications (e.g., capture pipelines, compression algorithms). However, the subjective nature of visual quality assessment makes it a challenging task, since traditional signal fidelity measures do not align well with human visual perception, mainly because not every distortion is equally noticeable. Further, the requirement of some image quality assessments of a full reference image (full-reference or "FR" models) is not possible to achieve in many cases. On the other hand, human subjective evaluation, is costly and hard to scale.

To address these challenges, proposed is a no-reference "NR" framework for objectively measuring image visual quality at scale without requiring a reference image, by generating a vision model that estimates or approximates human evaluation of image quality. The framework can be extended to cover different aesthetics (e.g., different country, culture and user group) and more-specific quality measurements (e.g., exposure, blurriness, color tone).

Instead of manually defining and extracting visual features, the framework directly feeds pixels into a deep neural network such as a convolutional neural network. This approach uses a large pre-trained image classification model (based for example on millions of images) and fine tunes the last layer of the neural network with human-scored image datasets (for example done on thousands of images). This framework provides good generalization ability and correlation with human evaluation. The framework turns the quality assessment problem into a machine learning problem that requires little domain knowledge, as visual features are automatically extracted from the neural network.

In some examples, the model takes image pixels in RGB space as input and predicts multiple image quality score distributions. The proposed quality scores are for overall quality, exposure, blurriness, color tone and noise. These quality scores are key factors for smartphone camera photos. Predicting multiple quality scores in the same network can significantly reduce model size and inference cost while not sacrificing model performance. The model is trained to estimate the distribution of the empirical human evaluation scores. For each score, the output is a probability mass function $p=[p1, p2, \ldots, pn]$ where n denotes the number of score buckets. Predicting score distribution is more effective than regressing images to mean evaluation scores. In using the model to evaluate the image quality, the mean of the predicted scores can be used as a single indicator.

In use of the framework, to estimate the image quality of a new image, model inference is run on the client or user device on which the image is captured. To avoid introducing latency increases to key performance metrics in the image capture pipeline, the quality assessment runs in an asynchronous manner that does not block or otherwise interfere with the image capture pipeline. The assessment task is initiated in a background or lower priority thread after the image has been captured. The image quality score is then reported independently, along with other camera or device events and parameters for use in the data analysis phase.

In some examples, provided is a method of image quality assessment, performed by one or more processors in an image capture device, including receiving notification of capture of an image, initiating an image quality assessment task to assess the quality of the image, the image quality assessment task includes determining suitability of the image for image quality assessment, running an image quality assessment model on the image to generate image quality assessment results, collecting data related to the capture of the image, and transmitting the image quality assessment results and the related data to an image quality assessment repository.

The image quality assessment task may be a lower priority asynchronous task. The image quality assessment model may be a machine learning model trained using an image classifier network trained on a dataset of general images, the machine learning model including a layer trained on image-quality rated images as a feature output layer.

Determining the suitability of the image may include identifying that at least one face is represented in the image, or identifying a specific device camera used to capture the image. Determining the suitability of the image includes verifying that image effects have not been applied to the image.

The data related to the capture of the image may include a model identifier, operating system, and operating system version of the image capture device. The data related to the capture of the image may include whether the image was discarded, saved or forwarded by the user.

In some examples, provided is a non-transitory computer-readable storage medium, the computer-readable storage medium including instructions that when executed by a computer, cause the computer to perform operations for image quality assessment according to any of the methods and limitations set forth above, the operations including but not limited to receiving notification of capture of an image, initiating an image quality assessment task to assess the quality of the image, the image quality assessment task includes determining suitability of the image for image quality assessment, running an image quality assessment model on the image to generate image quality assessment results, collecting data related to the capture of the image, and transmitting the image quality assessment results and the related data to an image quality assessment repository.

In some examples, provided is a computing apparatus comprising a processor and a memory storing instructions that, when executed by the processor, configure the apparatus to perform operations for image quality assessment according to any of the methods and limitations set forth above, the operations including but not limited to receiving notification of capture of an image, initiating an image quality assessment task to assess the quality of the image, the image quality assessment task includes determining suitability of the image for image quality assessment, running an image quality assessment model on the image to generate image quality assessment results, collecting data related to the capture of the image, and transmitting the image quality assessment results and the related data to an image quality assessment repository.

Other technical features may be readily apparent to one skilled in the art from the following figures, descriptions, and claims.

Networked Computing Environment

FIG. 1 is a block diagram showing an example messaging system 100 for exchanging data (e.g., messages and associated content) over a network. The messaging system 100 includes multiple instances of a user device 102, each of which hosts a number of applications, including a messaging client 104 and other applications 106.

Each messaging client 104 is communicatively coupled to other instances of the messaging client 104 (e.g., hosted on respective other user devices 102) and a messaging server system 108 via a network 110 (e.g., the Internet). A messaging client 104 can also communicate with locally-hosted applications 106 using Application Program Interfaces (APIs). The messaging system 100 also includes one or more user device 102, which are communicatively coupled to the messaging server system 108 via the network 110.

As used herein, the term messaging client 104 and messaging system 100 are deemed to include instant messaging platforms, social media platforms, content-sharing platforms, and other platforms in which a user forwards images to other users or posts images onto the platform.

A messaging client 104 is able to communicate and exchange data with other messaging clients 104 and with the messaging server system 108 via the network 110. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 110 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a user device 102 has sufficient processing capacity.

The messaging server system 108 supports various services and operations that are provided to the messaging client 104. Such operations include transmitting data to, receiving data from, and processing data generated by the messaging client 104. This data may include message content, user device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 114 is coupled to, and provides a programmatic interface to, application servers 112. The application servers 112 are communicatively coupled to a database server 118, which facilitates access to a database 124 that stores data associated with messages processed by the application servers 112. Similarly, a web server 126 is coupled to the application servers 112, and provides web-based interfaces to the application servers 112. To this end, the web server 126 processes incoming network requests over the Hypertext Transfer Protocol (HTTP) and several other related protocols.

The Application Program Interface (API) server 114 receives and transmits message data (e.g., commands and message payloads) between the user device 102 and the application servers 112. Specifically, the Application Program Interface (API) server 114 provides a set of interfaces (e.g., routines and protocols) that can be called or queried by the messaging client 104 in order to invoke functionality of the application servers 112. The Application Program Interface (API) server 114 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 116, and for possible access by another messaging client 104, the settings of a collection of media data (e.g., story), the retrieval of a list of friends of a user of a user device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 116, an image processing server 120, and a social network server 122. The messaging server 116 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 116, in view of the hardware requirements for such processing.

The application servers 112 also include an image processing server 120 that is dedicated to performing various image processing operations, typically with respect to images or video within the payload of a message sent from or received at the messaging server 116.

The social network server 122 supports various social networking functions and services and makes these functions and services available to the messaging server 116. To this end, the social network server 122 maintains and accesses an entity graph within the database 124. Examples of functions and services supported by the social network server 122 include the identification of other users of the messaging system 100 with which a particular user has relationships or is "following," and also the identification of other entities and interests of a particular user.

The messaging client 104 can notify a user of the user device 102, or other users related to such a user (e.g., "friends"), of activity taking place in one or more external resources, for example games or slimmed down versions of third party applications. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging system 100 in the illustrated example includes an image quality assessment server 128 as part of messaging server system 108, although image quality assessment server 128 may alternatively be provided as part of a separate server system. The image quality assessment server 128 receives image quality assessment results and the related data transmitted from the user devices 102, and performs analysis and data mining on the cumulative image quality assessment results to generate image-quality insights.

System Architecture

Figure 2:
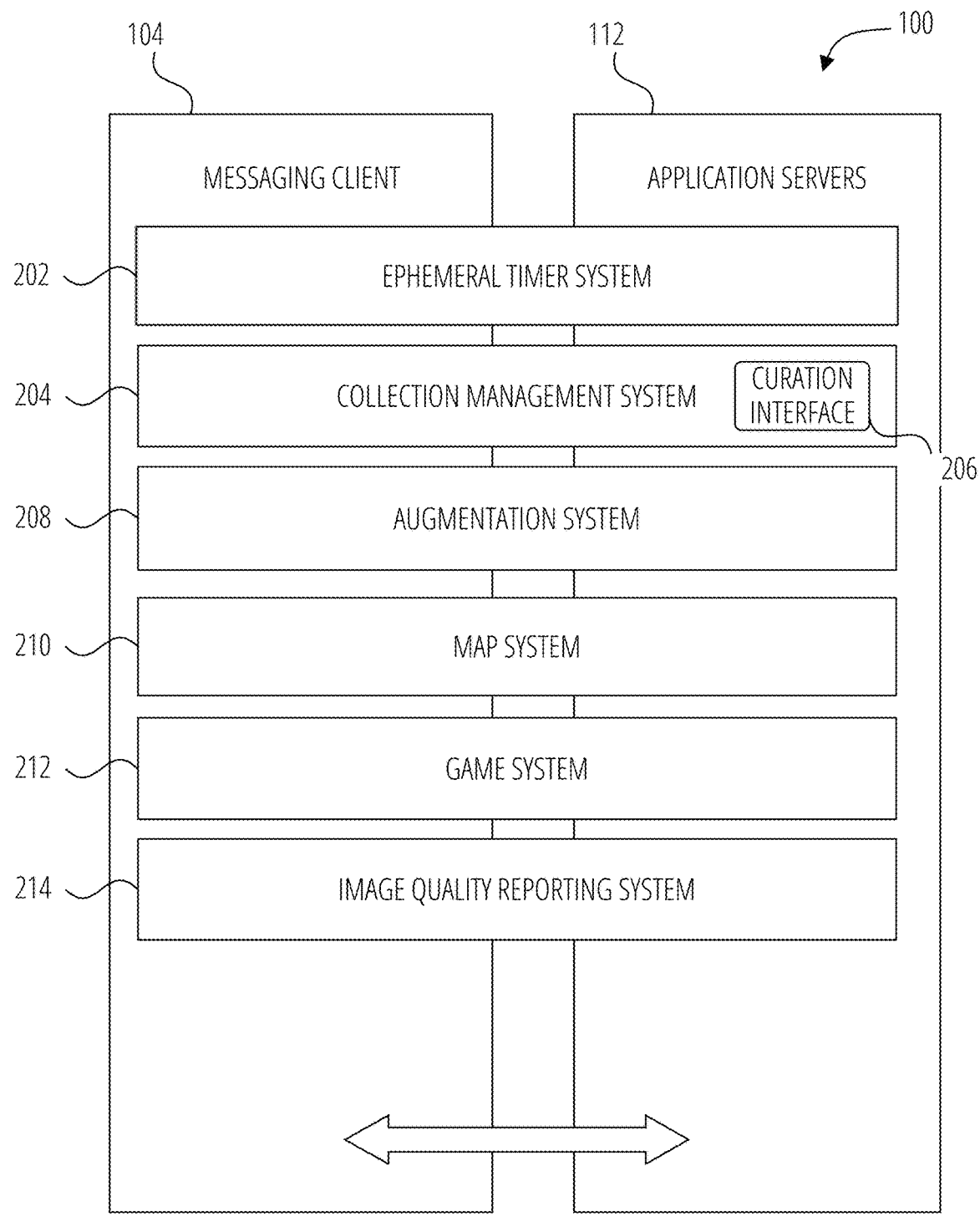
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client-side by the messaging client 104 and on the sever-side by the application servers 112. These subsystems include, for example, an ephemeral timer system 202, a collection management system 204, an augmentation system 208, a map system 210, a game system 212, and an image quality reporting system 214.

The ephemeral timer system 202 is responsible for enforcing the temporary or time-limited access to content by the messaging client 104 and the messaging server 116. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the user device 102. In another example, the augmentation system 208 operatively supplies a media overlay to the messaging client 104 based on other information, such as social network information of the user of the user device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the user device 102. For example, the media overlay may include text or image that can be overlaid on top of a photograph taken by the user device 102. In another example, the media overlay includes an identification of a location overlay (e.g., Venice beach), a name of a live event, or a name of a merchant overlay (e.g., Beach Coffee House). In another example, the augmentation system 208 uses the geolocation of the user device 102 to identify a media overlay that includes the name of a merchant at the geolocation of the user device 102. The media overlay may include other indicia associated with the merchant. The media overlays may be stored in the database 124 and accessed through the database server 118.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

The map system 210 provides various geographic location functions, and supports the presentation of map-based media content and messages by the messaging client 104. For example, the map system 210 enables the display of user icons or avatars on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The image quality reporting system 214 provides the image quality determination after image capture by the user device 102, as described in more detail below.

Figure 3:
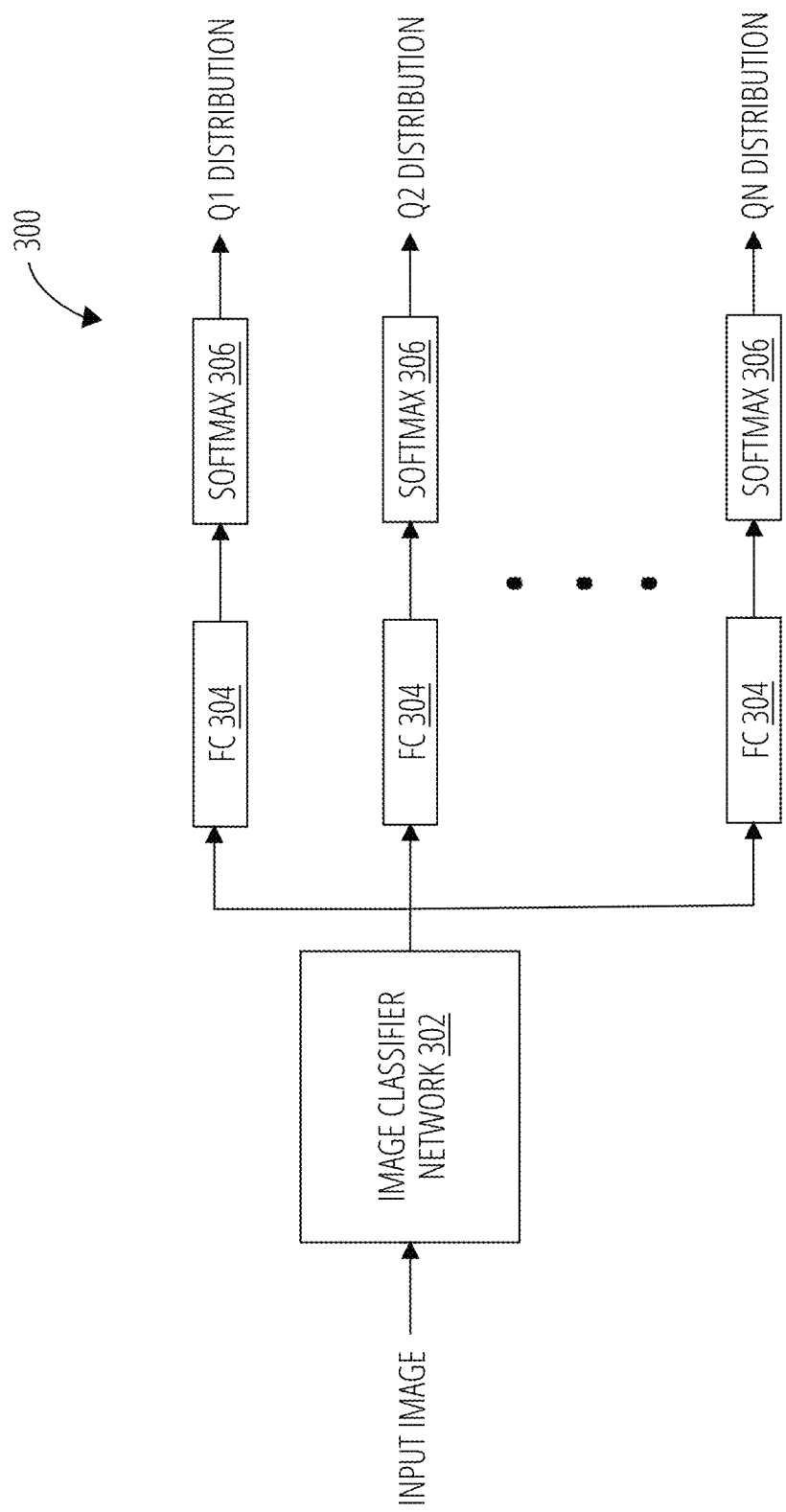
FIG. 3 is a schematic diagram illustrating an image quality assessment model according to some embodiments.

FIG. 3 is a schematic diagram illustrating an image quality assessment model 300 according to some embodiments. As illustrated in the figure, the quality assessment model 300 contains three major components, a baseline image classifier network 302, multiple FC layers 304 ("fully-connected" layers) and multiple softmax layers 306 The image classifier network 302 is a known pre-trained network with weights initialized by training on a dataset of millions of images such as ImageNet. Any commonly used image classification models such as Inception, MobileNet can be used, with the particular model being chosen depending on the required model accuracy and inference performance (latency, power consumption, and so forth).

In assessment model 300, the last layer of the image classifier network 302 has been selected to use as a feature output layer to the FC layers 304. The last layer of the image classifier network 302 is good for use as the feature output layer as it provides the most abstract features. However, an earlier layer of the image classifier network 302 may be selected as a feature output layer, for quality tasks like noise and blurriness, as smaller patches might have better features for use in these determinations.

The FC layers 304 take the high-level abstract features generated from the image classifier network 302 and output logits for each head. The FC layers 304 include trained parameters that translate image features into unnormalized quality scores. The FC layers 304 are trained as described below with reference to FIG. 4. The softmax layers 306 normalize the logits and provide a predicted probability distribution.

In machine learning, the loss function is determined as the difference between the actual output and the predicted output from the model for a single training example, while the average of the loss function for all the training examples is known as the cost function. For a given single training image, the output is a probability distribution of human scores with N ordered buckets. Because of the added softmax layers 306, the output of the assessment model 300 is also a probability distribution, satisfying SUM(pi)=1, $1<=i<=N$. The most common loss function used to measure the difference between two probability distributions is cross-entropy loss. However, cross-entropy loss lacks the inter-class relationships between score buckets, and the strict order information of the score buckets is lost in the cross-entropy loss function. Therefore, the assessment model 300 uses the squared Earth Mover's Distance (EMD) loss, which is defined as the minimum cost to move the mass of one distribution to another.

The FC layers 304 are trained as below using a training dataset of a few thousand images that have been scored by human scorers. To reduce overfitting issues resulting from the relatively small data set, image data augmentation techniques that do not significantly change the image composition are used to increase the set size, for example cropping and horizontal flipping of scored images.

Figure 4:
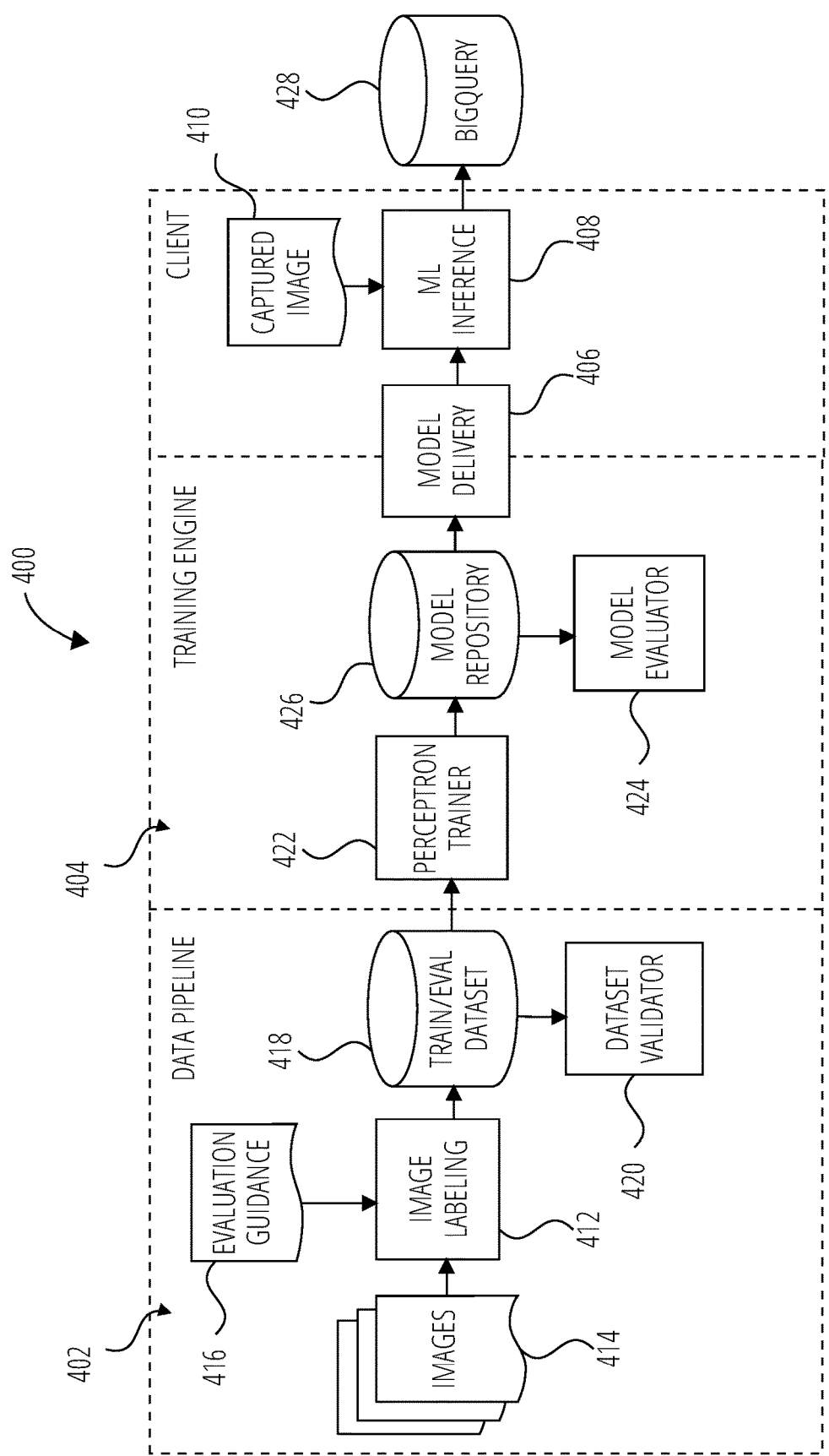
FIG. 4 is a schematic diagram illustrating a training system architecture according to some embodiments.

FIG. 4 is a schematic diagram illustrating a training system architecture 400 according to some embodiments. The architecture 400 generally comprises four loosely-coupled components, a data pipeline 402, a training engine 404, model delivery system 406 and client inference process 408. The architecture generates a dataset with pre-defined evaluation guidance, a training a model from this dataset, delivers the model to a user device 102 and runs client inference on the user device 102 to generate a quality score from a captured image 410 on the user device 102.

The image labeling system 412 provides a platform for adding human-specified quality evaluation labels to images from an image set 414. The resulting training dataset 418 comprises labeled images with verified quality assessments that can be used to train and assess the assessment model 300. Human annotators use the image labeling system 412 to evaluate image quality-based factors such as blurriness and noise. The image labeling system 412 also supports image evaluations intersections, in which multiple annotators annotate the same image.

Annotators make subjective judgments following evaluation guidance 416. The evaluation guidance 416 provides a definition of what each score represents and ensures consistency, as far as possible, between different annotators. Also included is a dataset validator 420, which checks the training dataset 418 to ensure that the training dataset 418 has data quality, namely that the images and labels in the training dataset 41 are both correct and meaningful. The dataset validator 420, uses validation constraints to check for correctness, meaningfulness, and security of data in the training dataset 418.

The training engine 404 comprises a perceptron trainer 422, a model repository 426 and a model evaluator 424.

The perceptron trainer 422 is a config-driven end-to-end training API library together with a model zoo written in Tensorflow2, which can train a large image classification model and support transfer learning. The trained model generated by the perceptron trainer 422 is stored in the model repository 426 and can be converted to the compressed fast-dnn format that is supported by the client inference process 408. In operation, the training process run by the perceptron trainer 422 is specified by a configuration file that defines how the training process should run, and operates on the labeled training dataset 418. The perceptron trainer 422 also supports injecting raw Tensorflow codes for flexibility.

Models generated by the perceptron trainer 422 are evaluated by the model evaluator 424. The model evaluator 424 operates on data that has not been seen by the perceptron trainer 422, to verify whether and how well generated models actually work, and whether their assessment scores can be trusted. The model evaluator 424 can use any known model evaluation technique, such as holdout or cross-validation, using known classification metrics.

The model delivery system 406 provides a platform for delivering the correct version of the trained model to the correct user device 102. The model delivery system 406 includes a user interface that permits software engineers to update the models if needed, and a delivery system to transmit the model files reliably to user devices 102.

The trained model is run on captured images 410 in the client inference process 408 on a user device 102. To avoid introducing latency increases to key performance metrics of the user device 102, the quality assessment task performed by the client inference process 408 runs in an asynchronous, non-blocking manner after an image has been captured. The assessment task is initiated in a low-priority background thread after all the steps in the image capture pipeline have been completed. Once the quality score is calculated for an image, it is reported independently by the user device 102 to the data analysis system 428 along with related camera events and parameters, and device parameters. The reported quality score is not related to a specifically-identifiable user device 102 or user account.

Figure 5:
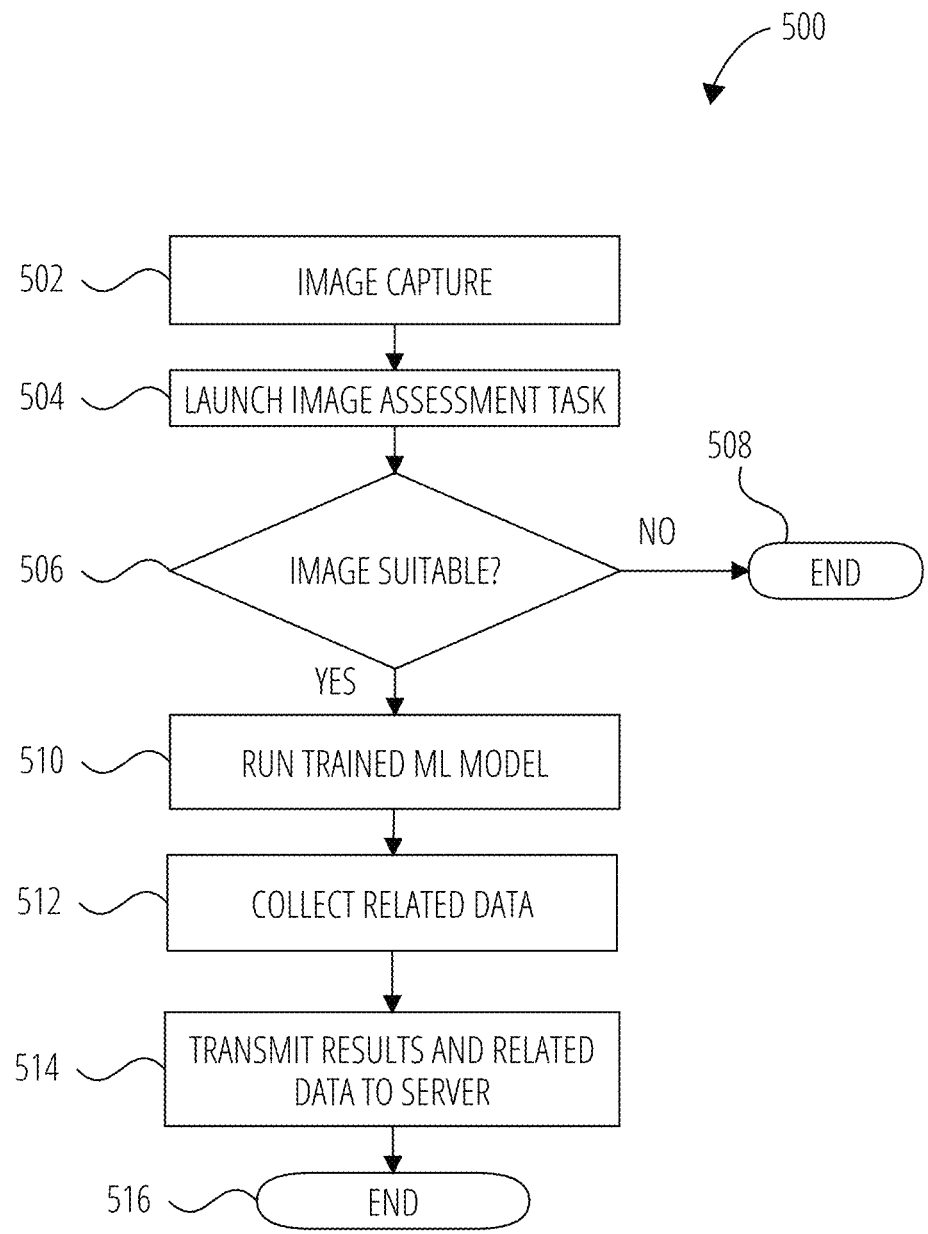
FIG. 5 is a flowchart illustrating an image quality assessment method according to some examples.

FIG. 5 is a flowchart 500 illustrating a method of performing image quality assessment according to some examples. For explanatory purposes, the operations of the flowchart 500 are described herein as occurring in serial, or linearly. However, multiple operations of the flowchart 500 may occur in parallel. In addition, the operations of the flowchart 500 need not be performed in the order shown and/or one or more blocks of the flowchart 500 need not be performed and/or can be replaced by other operations. Furthermore, while the operations in flowchart 500 are described with reference to the client inference process 408 running on a user device 102, the associated functionality may alternative be provided as part of a distributed processing system including one or more servers.

The flowchart commences at operation 502 with initiation of image capture by the user device 102 in response to the receipt of user input to capture an image. In some examples, the user input to capture the image is received by the messaging client 104. In response to the capture of an image or in response to user input to capture an image, the messaging client 104 (or other application 106) on the user device 102 launches an image quality assessment task in operation 504. Since the speed and timing of the image quality assessment task is unrelated to the user experience, it runs asynchronously with the image capture pipeline in a low priority thread, to avoid affecting the user experience.

In operation 506 the image quality assessment task determines whether or not an image meets any required parameters. The particular parameters for determining suitability of the image depend on the application. For example, for the messaging system 100, the image quality assessment may require that the image be a "selfie" image, since the quality of such images may be of particular relevance to the user of the user device 102 and thus to the operator of the messaging system 100. That the image is a selfie can be verified by the image assessment task checking that the image was captured by a user-facing camera on the user device 102 and by determining, using image recognition techniques, that only one, or two or less, faces are present in the image. Other parameters may also be verified, for example, that the image does not include any augmented reality effects or other image modifications, which would skew the image quality results.

If the image does not meet the required parameters in operation 506, the image assessment task ends at operation 508. If the image does meet the required parameters in operation 510, the image assessment task runs the trained image quality assessment model 300 on the image to generate multiple image quality score distributions as described above with reference to FIG. 3. The score distributions can relate to various quality factors such as blurriness and image noise.

In operation 512, the image assessment task collects relevant data related to the captured image. This can for example be the model name, operating system and OS version of the user device 102, the version of the messaging client 104, whether the image was discarded, saved or forwarded by the user, flash activation, zoom level, an image timestamp, and so forth.

In operation 514 the image quality results and the related data are transmitted by the messaging client 104 to the data analysis system 428, where, together with image quality results and related data from other images captured with other user devices 102, the data analysis system 428 can perform analysis and data mining on the cumulative results to generate image-quality insights. The flowchart 500 then ends at operation 516 until another image capture is initiated by the user.

Machine Architecture

Figure 6:
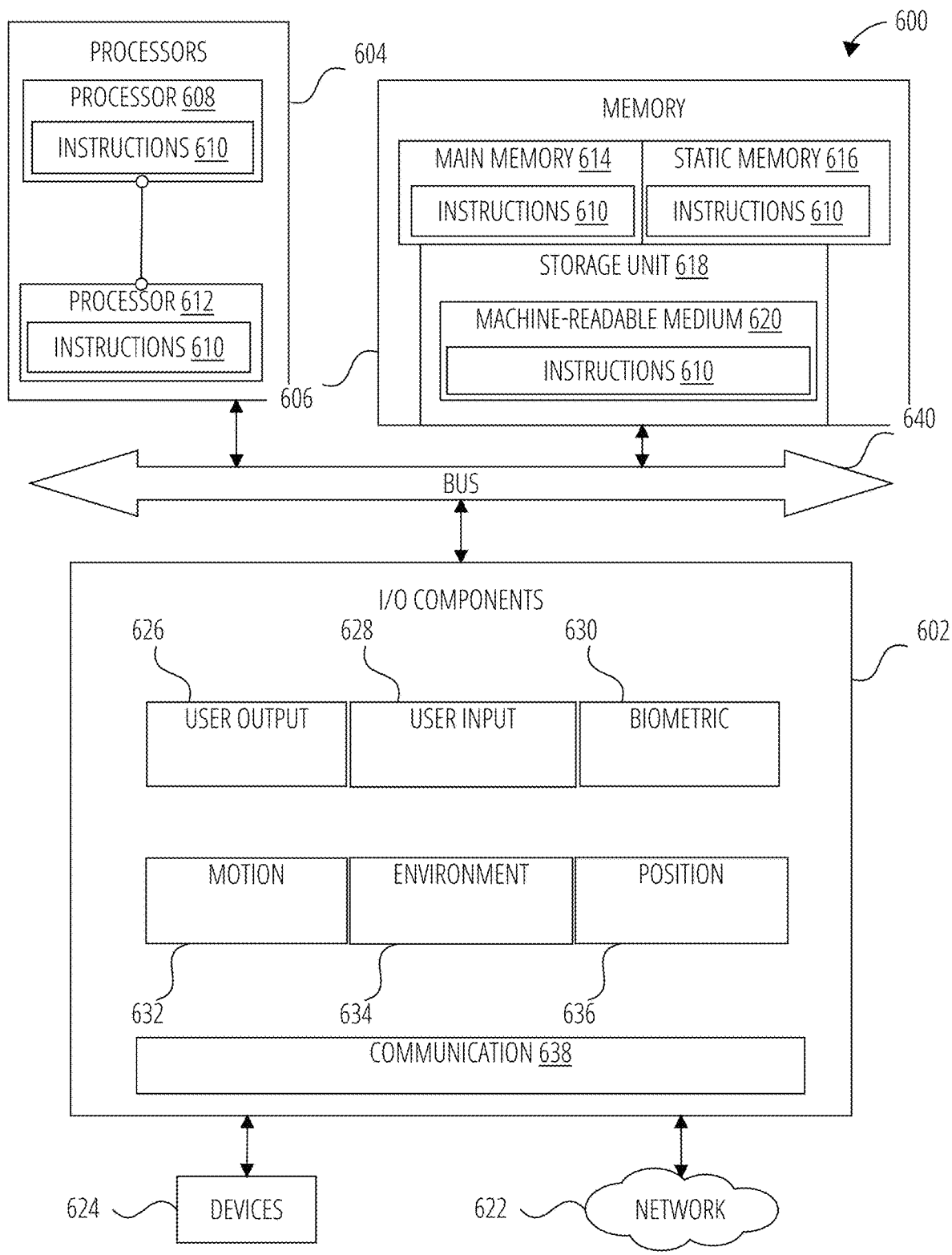
FIG. 6 is a diagrammatic representation of a machine in the form of a computer system within which a set of instructions may be executed for causing the machine to perform any one or more of the methodologies discussed herein, in accordance with some examples.

FIG. 6 is a diagrammatic representation of the machine 600 within which instructions 610 (e.g., software, a program, an application, an applet, an app, or other executable code) for causing the machine 600 to perform any one or more of the methodologies discussed herein may be executed. For example, the instructions 610 may cause the machine 600 to execute any one or more of the methods described herein. The instructions 610 transform the general, non-programmed machine 600 into a particular machine 600 programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 610, sequentially or otherwise, that specify actions to be taken by the machine 600. Further, while only a single machine 600 is illustrated, the term "machine" shall also be taken to include a collection of machines that individually or jointly execute the instructions 610 to perform any one or more of the methodologies discussed herein. The machine 600, for example, may comprise the user device 102 or any one of a number of server devices forming part of the messaging server system 108. In some examples, the machine 600 may also comprise both client and server systems, with certain operations of a particular method or algorithm being performed on the server-side and with certain operations of the particular method or algorithm being performed on the client-side.

The machine 600 may include processors 604, memory 606, and input/output I/O components 602, which may be configured to communicate with each other via a bus 640. In an example, the processors 604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 608 and a processor 612 that execute the instructions 610. The term "processor" is intended to include multi-core processors that may comprise two or more independent processors (sometimes referred to as "cores") that may execute instructions contemporaneously. Although FIG. 6 shows multiple processors 604, the machine 600 may include a single processor with a single-core, a single processor with multiple cores (e.g., a multi-core processor), multiple processors with a single core, multiple processors with multiples cores, or any combination thereof.

The memory 606 includes a main memory 614, a static memory 616, and a storage unit 618, both accessible to the processors 604 via the bus 640. The main memory 606, the static memory 616, and storage unit 618 store the instructions 610 embodying any one or more of the methodologies or functions described herein. The instructions 610 may also reside, completely or partially, within the main memory 614, within the static memory 616, within machine-readable medium 620 within the storage unit 618, within at least one of the processors 604 (e.g., within the Processor's cache memory), or any suitable combination thereof, during execution thereof by the machine 600.

The I/O components 602 may include a wide variety of components to receive input, provide output, produce output, transmit information, exchange information, capture measurements, and so on. The specific I/O components 602 that are included in a particular machine will depend on the type of machine. For example, portable machines such as mobile phones may include a touch input device or other such input mechanisms, while a headless server machine will likely not include such a touch input device. It will be appreciated that the I/O components 602 may include many other components that are not shown in FIG. 6. In various examples, the I/O components 602 may include user output components 626 and user input components 628. The user output components 626 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 628 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 602 may include biometric components 630, motion components 632, environmental components 634, or position components 636, among a wide array of other components. For example, the biometric components 630 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 632 include acceleration sensor components (e.g., accelerometer), gravitation sensor components, rotation sensor components (e.g., gyroscope).

The environmental components 634 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user device 102 may have a camera system comprising, for example, front cameras on a front surface of the user device 102 and rear cameras on a rear surface of the user device 102. The front cameras may, for example, be used to capture still images and video of a user of the user device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user device 102 may also include a 360° camera for capturing 360° photographs and videos.

Further, the camera system of a user device 102 may include dual rear cameras (e.g., a primary camera as well as a depth-sensing camera), or even triple, quad or penta rear camera configurations on the front and rear sides of the user device 102. These multiple cameras systems may include a wide camera, an ultra-wide camera, a telephoto camera, a macro camera and a depth sensor, for example.

The position components 636 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 602 further include communication components 638 operable to couple the machine 600 to a network 622 or devices 624 via respective coupling or connections. For example, the communication components 638 may include a network interface Component or another suitable device to interface with the network 622. In further examples, the communication components 638 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 624 may be another machine or any of a wide variety of peripheral devices (e.g., a peripheral device coupled via a USB).

Moreover, the communication components 638 may detect identifiers or include components operable to detect identifiers. For example, the communication components 638 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 638, such as location via Internet Protocol (IP) geolocation, location via Wi-Fi® signal triangulation, location via detecting an NFC beacon signal that may indicate a particular location, and so forth.

The various memories (e.g., main memory 614, static memory 616, and memory of the processors 604) and storage unit 618 may store one or more sets of instructions and data structures (e.g., software) embodying or used by any one or more of the methodologies or functions described herein. These instructions (e.g., the instructions 610), when executed by processors 604, cause various operations to implement the disclosed examples.

The instructions 610 may be transmitted or received over the network 622, using a transmission medium, via a network interface device (e.g., a network interface component included in the communication components 638) and using any one of several well-known transfer protocols (e.g., hypertext transfer protocol (HTTP)). Similarly, the instructions 610 may be transmitted or received using a transmission medium via a coupling (e.g., a peer-to-peer coupling) to the devices 624.

Software Architecture

Figure 7:
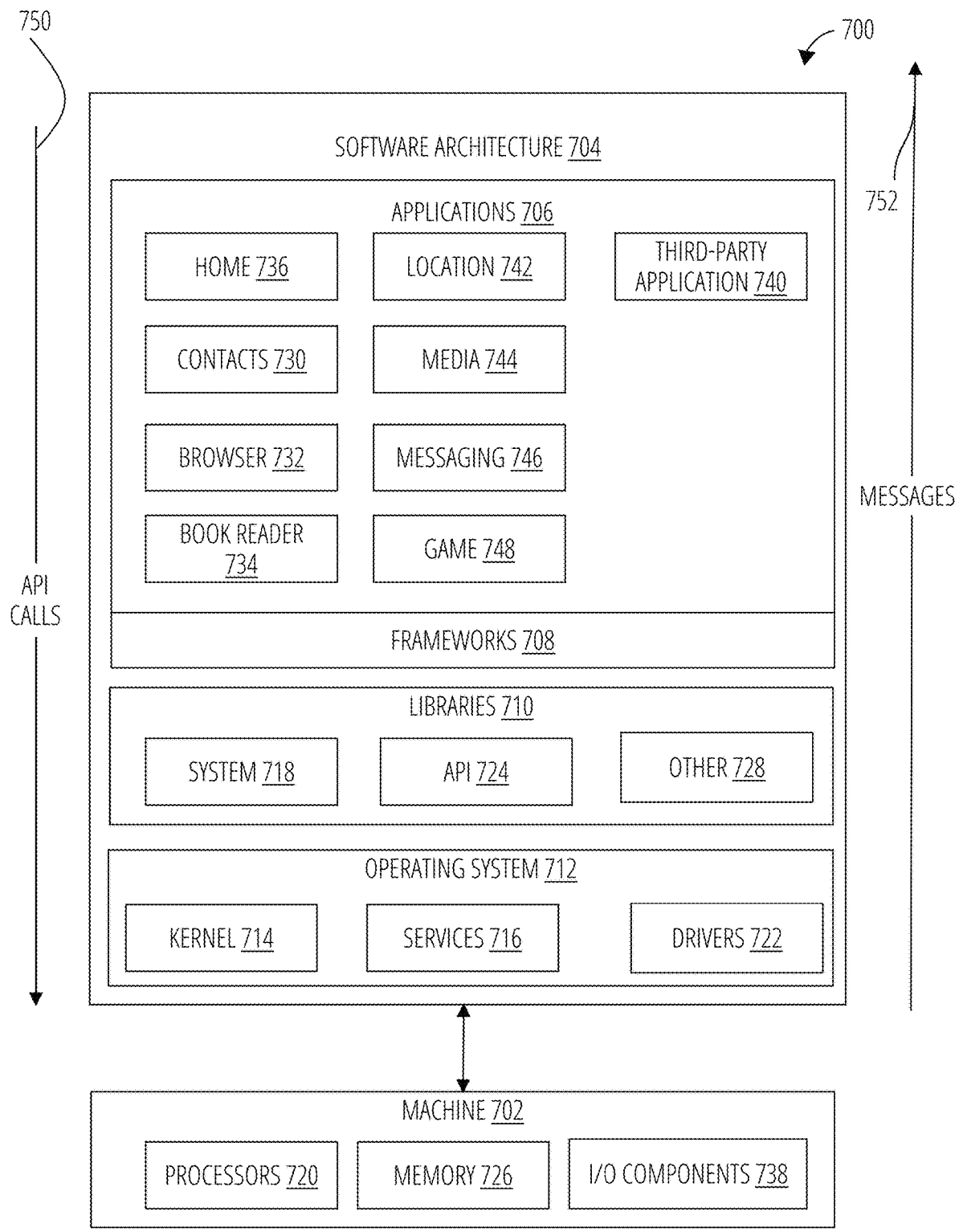
FIG. 7 is a block diagram showing a software architecture within which examples may be implemented.

FIG. 7 is a block diagram 700 illustrating a software architecture 704, which can be installed on any one or more of the devices described herein. The software architecture 704 is supported by hardware such as a machine 702 that includes processors 720, memory 726, and I/O components 738. In this example, the software architecture 704 can be conceptualized as a stack of layers, where each layer provides a particular functionality. The software architecture 704 includes layers such as an operating system 712, libraries 710, frameworks 708, and applications 706. Operationally, the applications 706 invoke API calls 750 through the software stack and receive messages 752 in response to the API calls 750.

The operating system 712 manages hardware resources and provides common services. The operating system 712 includes, for example, a kernel 714, services 716, and drivers 722. The kernel 714 acts as an abstraction layer between the hardware and the other software layers. For example, the kernel 714 provides memory management, processor management (e.g., scheduling), component management, networking, and security settings, among other functionality. The services 716 can provide other common services for the other software layers. The drivers 722 are responsible for controlling or interfacing with the underlying hardware. For instance, the drivers 722 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 710 provide a common low-level infrastructure used by the applications 706. The libraries 710 can include system libraries 718 (e.g., C standard library) that provide functions such as memory allocation functions, string manipulation functions, mathematic functions, and the like. In addition, the libraries 710 can include API libraries 724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 710 can also include a wide variety of other libraries 728 to provide many other APIs to the applications 706.

The frameworks 708 provide a common high-level infrastructure that is used by the applications 706. For example, the frameworks 708 provide various graphical user interface (GUI) functions, high-level resource management, and high-level location services. The frameworks 708 can provide a broad spectrum of other APIs that can be used by the applications 706, some of which may be specific to a particular operating system or platform.

In an example, the applications 706 may include a home application 736, a contacts application 730, a browser application 732, a book reader application 734, a location application 742, a media application 744, a messaging application 746, a game application 748, and a broad assortment of other applications such as a third-party application 740. The applications 706 are programs that execute functions defined in the programs. Various programming languages can be employed to create one or more of the applications 706, structured in a variety of manners, such as object-oriented programming languages (e.g., Objective-C, Java, or C++) or procedural programming languages (e.g., C or assembly language). In a specific example, the third-party application 740 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 740 can invoke the API calls 750 provided by the operating system 712 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"User device" refers to any machine that interfaces to a communications network to obtain resources from one or more server systems or other user devices. A user device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/ modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data in a non-transitory manner. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method of image quality assessment, performed by one or more processors in an image capture device, comprising:
   receiving notification of capture of an image;
   initiating an image quality assessment task to assess the quality of the image, the image quality assessment task comprising:
   determining suitability of the image for image quality assessment, including by determining whether or not a media overlay has been applied to the image;
   based on determining that a media overlay has been applied to the image, terminating the method; and
   based on determining suitability of the image for image quality assessment, including at least that a media overlay has not been applied to the image, performing the following operations:
      running an image quality assessment model on the image to generate image quality assessment results;
      collecting data related to the capture of the image; and
      transmitting the image quality assessment results and the related data to an image quality assessment repository.

2. The method of claim 1, wherein the image quality assessment task is a lower priority asynchronous task to an image capture pipeline.

3. The method of claim 1, wherein the image quality assessment model is a machine learning model trained using an image classifier network trained on a dataset of general images, the machine learning model including a layer trained on image-quality rated images as a feature output layer.

4. The method of claim 1, wherein determining the suitability of the image comprises identifying that two or less faces are depicted in the image and that the image was captured with a front-facing camera of the image capture device.

5. The method of claim 1, wherein the data related to the capture of the image comprises a model identifier, an operating system identifier, and an operating system version of the image capture device.

6. The method of claim 1, wherein the data related to the capture of the image comprises whether the image was discarded, saved or forwarded by a user of the image capture device.

7. A non-transitory computer-readable storage medium, the computer-readable storage medium including instructions that when executed by a computer, cause the computer to perform operations for image quality assessment, the operations comprising:
receiving notification of capture of an image;
initiating an image quality assessment task to assess the quality of the image, the image quality assessment task comprising:
determining suitability of the image for image quality assessment, including by determining whether or not a media overlay has been applied to the image;
based on determining that a media overlay has been applied to the image, terminating performance of the operations; and
based on determining suitability of the image for image quality assessment, including at least that a media overlay has not been applied to the image, performing the following operations:
running an image quality assessment model on the image to generate image quality assessment results;
collecting data related to the capture of the image; and
transmitting the image quality assessment results and the related data to an image quality assessment repository.

8. The non-transitory computer-readable storage medium of claim 7, wherein the image quality assessment task is a lower priority asynchronous task to an image capture pipeline.

9. The non-transitory computer-readable storage medium of claim 7, wherein the image quality assessment model is a machine learning model trained using an image classifier network trained on a dataset of general images, the machine learning model including a layer trained on image-quality rated images as a feature output layer.

10. The non-transitory computer-readable storage medium of claim 7, wherein determining the suitability of the image comprises identifying that two or less faces are depicted in the image and that the image was captured with a front-facing camera of an image capture device.

11. The non-transitory computer-readable storage medium of claim 7, wherein the data related to the capture of the image comprises whether the image was discarded, saved or forwarded by a user of an image capture device.

12. A computing apparatus comprising:
at least one processor; and
a memory storing instructions that, when executed by the at least one processor, configure the apparatus to perform operations for image quality assessment, the operations comprising:
receiving notification of capture of an image;
initiating an image quality assessment task to assess the quality of the image, the image quality assessment task comprising:
determining suitability of the image for image quality assessment, including by determining whether or not a media overlay has been applied to the image;
based on determining that a media overlay has been applied to the image, terminating performance of the operations; and
based on determining suitability of the image for image quality assessment, including at least that a media overlay has not been applied to the image, performing the following operations:
running an image quality assessment model on the image to generate image quality assessment results;
collecting data related to the capture of the image; and
transmitting the image quality assessment results and the related data to an image quality assessment repository.

13. The computing apparatus of claim 12, wherein the image quality assessment task is a lower priority asynchronous task to an image capture pipeline.

14. The computing apparatus of claim 12, wherein the image quality assessment model is a machine learning model trained using an image classifier network trained on a dataset of general images, the machine learning model including a layer trained on image-quality rated images as a feature output layer.

15. The computing apparatus of claim 12, wherein determining the suitability of the image comprises identifying that two or less faces are depicted in the image and that the image was captured with a front-facing camera of an image capture device.

16. The computing apparatus of claim 12, wherein the data related to the capture of the image comprises whether the image was discarded, saved or forwarded by a user of an image capture device.

17. The non-transitory computer-readable storage medium of claim 7, wherein the data related to the capture of the image comprises a model identifier, an operating system identifier, and an operating system version of an image capture device.

18. The computing apparatus of claim 12, wherein the data related to the capture of the image comprises a model identifier, an operating system identifier, and an operating system version of an image capture device.

\* \* \* \* \*